May 20, 1930.    E. L. BAGGSTROM    1,759,386
TIRE RIM OF MOTOR AND LIKE VEHICLES
Filed Sept. 8, 1927
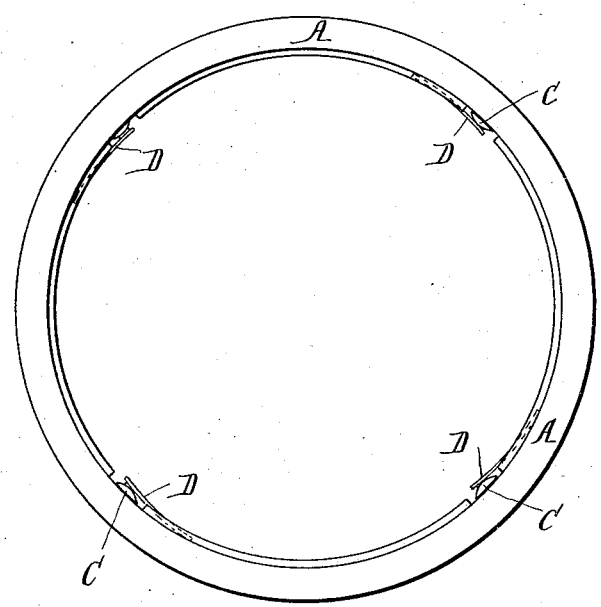
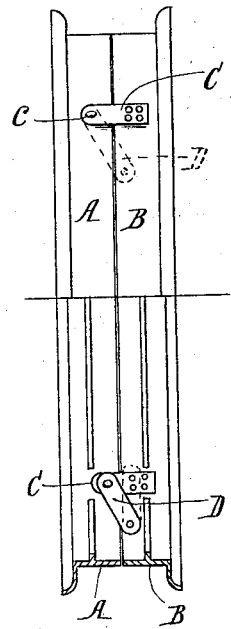
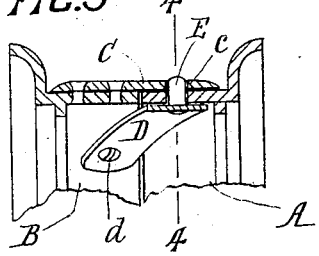
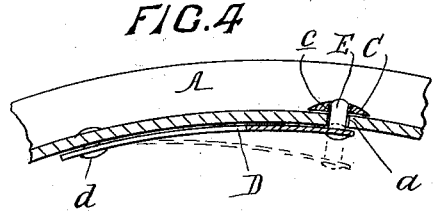
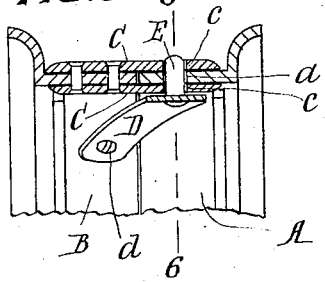
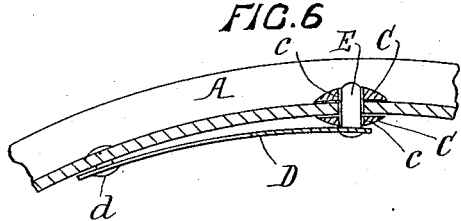
Elias Lemuel Baggstrom, Inventor
By B. Singer, Atty Patented May 20, 1930

1,759,386

UNITED STATES PATENT OFFICE

ELIAS LEMUEL BAGGSTROM, OF MANGERE, AUCKLAND, NEW ZEALAND, ASSIGNOR TO THE BAGGSTROM PATENT MOTOR RIM COMPANY LIMITED, OF TAURANGA, NEW ZEALAND

TIRE RIM OF MOTOR AND LIKE VEHICLES

Application filed September 8, 1927, Serial No. 218,335, and in New Zealand April 26, 1927.

This invention relates to the usual types of removable tire rims used principally in connection with the wheels of motor vehicles, to hold the pneumatic tires thereof and which are made to be placed on and removed from the wheel.

The object of the invention is to provide a construction of rim that will allow for the easy removal and replacement of a tire thereon and that will hold the tire securely in its position on the wheel when the rim is secured thereon in any of the usual ways or variations thereof.

The invention is illustrated in the accompanying drawings, in which:—

Figure 1 is a side elevation of the wheel rim.

Figure 2 is an end elevation thereof, a portion being in section.

Figure 3 is an enlarged cross sectional elevation taken through one of the joints, and showing one form of the invention.

Figure 4 is a longitudinal section on the line 4—4 of Figure 3.

Figure 5 is a similar view to Figure 3 but showing an alternative form of the invention.

Figure 6 is a longitudinal section on the line 6—6 of Figure 5.

In this invention the rim is made in two circumferential parts or sections A and B which butt together to form the whole channel shape required in these rims. On one section B at approved distances apart around its outer periphery are lugs C which may be attached or formed integrally with this section and which extend transversely and overlap the periphery of the other section A.

In some instances these lugs may be arranged only upon the outer periphery of the part B so that they overlap the outer periphery of the part A, as in Figures 3 and 4. In other instances, in order to increase the strength, the lugs may be arranged in pairs on both faces of the part B so that the part A then passes in between them, as in Figures 1, 5 and 6. Each lug near its end is made with an aperture $c$ therein and this coincides with a similar aperture $a$ made through the part of the rim overlapped thereby, and with the aperture in the other lug of the pair when the lugs are arranged in pairs. The lugs are preferably made with transversely curved outer surfaces, as shown in Figures 4 and 6, in order to remove any liability to damage the tire tube, and tire cover edges, that rest upon them when the tire is assembled.

In connection with each such lug or each pair of lugs, there is attached to the inner periphery of the part B, a spring tongue D which is curved to lie against the arc surface of the inner periphery of the rim and is attached to it at one end by a rivet $d$ which causes it to spring normally outward into close contact with the said surface. This rivet also forms a pivot upon which the tongue may be swung laterally at its free end. The tongue in some instances may be pivoted on the part A.

The said tongue, at its free end, has a pin E affixed to its outer face and the tongue is so positioned that this pin is adapted to pass out through the aperture $a$ of the part A by reason of the normal springy tension of the tongue. The pin is made long enough to pass into the aperture $c$ of the lug C or through both lugs when such lug or lugs has or have been passed across the part A in the assembly of the two rim parts together. It therefore serves to lock the two parts in the assembled condition, and as it also extends diagonally across both parts, it serves as an additional strut to hold the two parts together. These means being disposed at a number of points around the circumference of the rim, an effectual working jointing of the two parts is obtained.

When the parts A and B are to be disassembled to allow for the removal and replacement of a tire, each spring tongue is levered out at its free end, to withdraw the pin E from the apertures $a$ and $c$, and is then given a partial turn to cause it to turn in from the part A and rest either on the part A or on the part B as the case may be. The two rim parts may thus be drawn apart, and may be re-assembled, and then locked, by turning the tongues to cause their pins to again enter the apertures $a$ and $c$.

In some instances the relative positions of the lugs and spring tongues may be varied and other alterations in details may be made without departing from the general features of the invention.

I claim:

A wheel rim comprising two circumferential parts of the same diameter arranged to butt joint together, and one having apertures at intervals around its circumference, lugs affixed to the other part to extend transversely across the surface of the first part and each having a hole therein adapted to coincide with one of the said apertures, the said lugs being arranged in pairs so that those of each pair extend transversely from the opposite peripheral faces of the rim part to which they are affixed and receive the other part of the rim between them, spring tongues disposed upon the inner periphery of the rim and each pivoted at one of its ends to one part thereof so that it springs outwards at the free end, and having a pin on the outer side of its free end arranged to pass out through the aperture in the rim part and also through the holes in the corresponding lugs.

In testimony whereof, I affix my signature.

ELIAS LEMUEL BAGGSTROM.